United States Patent [19]

Lunz et al.

[11] Patent Number: 4,655,612
[45] Date of Patent: Apr. 7, 1987

[54] BEARING ADJUSTMENT APPARATUS

[75] Inventors: Erich Lunz, Lonnerstadt; Reinhard Schwinghammer, Tuchenbach, both of Fed. Rep. of Germany

[73] Assignee: INA Walzlager Schaeffler KG, Fed. Rep. of Germany

[21] Appl. No.: 831,145

[22] Filed: Feb. 19, 1986

[30] Foreign Application Priority Data

Mar. 20, 1985 [DE] Fed. Rep. of Germany ....... 3509996

[51] Int. Cl.⁴ ............................................. F16C 29/06
[52] U.S. Cl. ..................................................... 384/45
[58] Field of Search ............................. 384/45, 43, 44; 464/168

[56] References Cited

U.S. PATENT DOCUMENTS

| | | | |
|---|---|---|---|
| 3,790,233 | 2/1974 | Polidor | 384/57 |
| 4,231,621 | 11/1980 | Teramachi | 384/45 |
| 4,527,842 | 7/1985 | Teramachi | 384/45 |
| 4,557,530 | 12/1985 | Haase | 384/45 |

Primary Examiner—Lenard A. Footland
Attorney, Agent, or Firm—Bierman and Muserlian

[57] ABSTRACT

An apparatus for height adjustment of a rolling bearing for longitudinal movement comprising a support body having two straight parallel race sections connected at their ends by two semicircular race sections, said support body being encircled by a guide element for guiding and/or holding rolling bodies in the race sections, the rolling bearing being supported by two adjusting wedges moveable relative to each other whose wedge surfaces are inclined opposite to each other in the longitudinal direction of the race, characterized in that the support body extends beyond the guide element transverse to the longitudinal race direction and the adjusting wedges having through recesses engaging the guide element and the zones of the support body extending beyond the guide elements being supported by lateral faces of the adjusting wedges delimiting the recesses.

6 Claims, 3 Drawing Figures

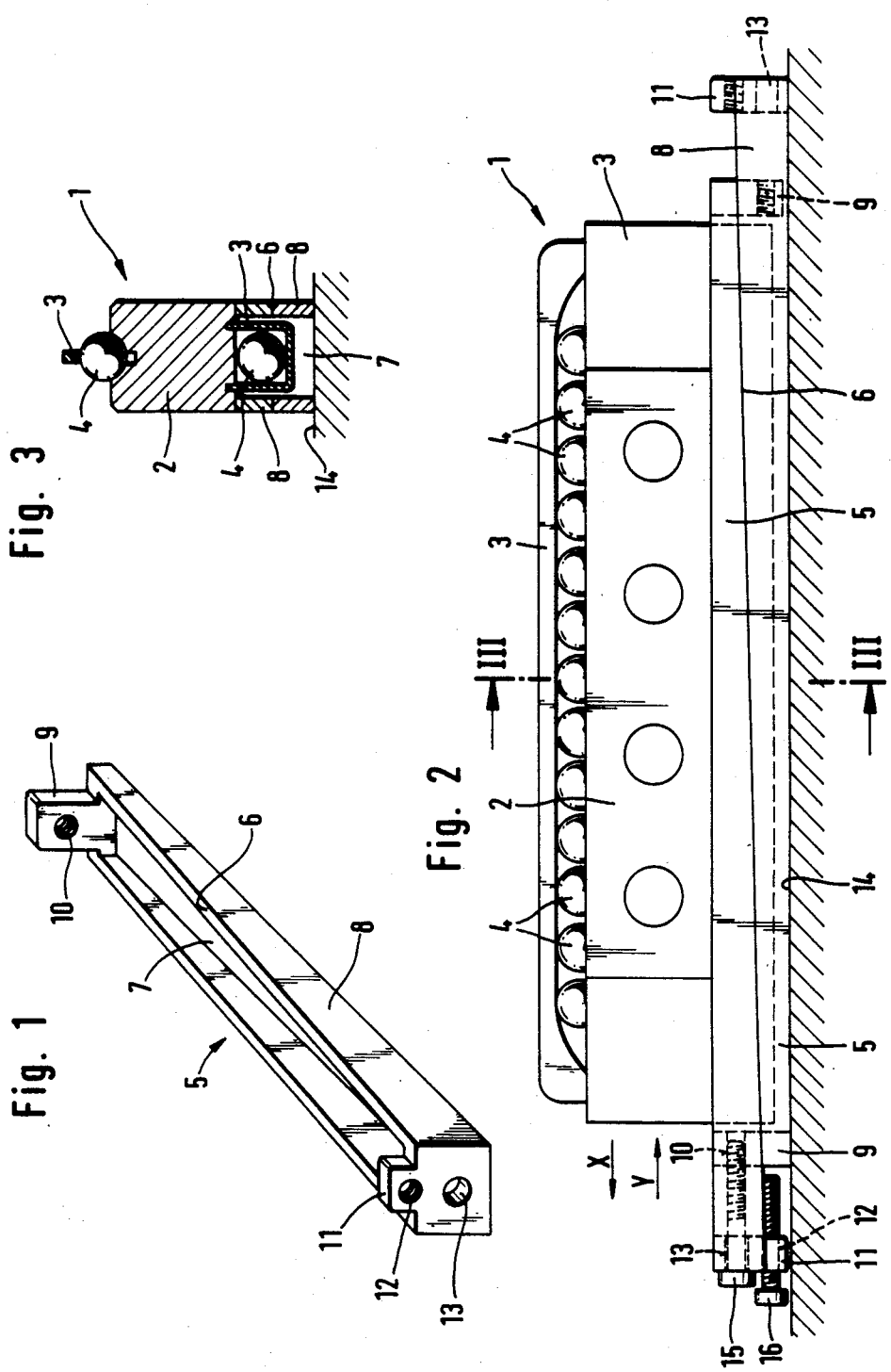

BEARING ADJUSTMENT APPARATUS

STATE OF THE ART

Devices for the adjustment of the height of rolling bearings for longitudinal movement are known as in CH-PS No. 446,823 and for fine adjustments, the known devices have considerable advantages over the known devices using an eccentric. However, the known devices of this type suffer disadvantages when the structural height of the rolling bearing is considerably increased due to the adjusting wedges so that this type of height adjustment can not be used in many cases.

OBJECTS OF THE INVENTION

It is an object of the invention to provide an apparatus for height adjustment of rolling bearings of this type in a simple and progressive manner with the advantages of fine adjustment with a relatively small increase in structural height.

This and other objects and advantages of the invention will become obvious from the following detailed description.

THE INVENTION

The novel apparatus of the invention for height adjustment of a rolling bearing for longitudinal movement comprises a support body having two straight parallel race sections connected at their ends by two semicircular race sections, said support body being encircled by a guide element for guiding and/or holding rolling bodie in the race sections, the rolling bearing being supported by two adjusting wedges moveable relative to each other whose wedge surfaces are inclined opposite to each other in the longitudinal direction of the race, characterized in that the support body extends beyond the guide element transverse to the longitudinal race direction and the adjusting wedges having through recesses engaging the guide element and the zones of the support body extending beyond the guide element being supported by lateral faces of the adjusting wedges delimiting the recesses.

It is particularly advantageous if the total height of the adjusting wedges is only slightly greater than the portion of the guide element engaging the adjusting wedge recesses. This construction creates a particularly space saving device suitable for all applications because the structural height of the rolling bearing is increased only by what little is required for the guide element to run freely over a bearing surface on the housing.

In another embodiment of the invention, the length of the through recesses is greater than the length of the guide element which makes it possible, according to another embodiment of the invention, for the adjusting wedges to be of identical design. This construction results, on the one hand, in the clearance in the longitudinal direction of the rolling bearing required for the adjustment, and the production of the adjusting wedges themselves is substantially simplified and less expensive on the other hand. In addition, there is another advantage in assembly since any danger of a mixup of adjusting wedges is eliminated.

Finally, another embodiment of the invention provides for the adjusting wedges to have at their faces threaded and/or through holes for the accommodation of adjusting screws as this arrangement makes it possible to accomplish the adjustment in a simple manner from both faces, thereby simplifying handling substantially.

Refering now to the drawings:

FIG. 1 is a plan view of an adjusting wedge of the invention,

FIG. 2 is an end view of the adjustment device of the invention with the assembled rolling bearing, and FIG. 3 is a cross-section taken along line III—III of FIG. 2.

The apparatus for the height adjustment of a rolling bearing 1 consisting of a support body 2 and a guide element 3 which guides and holds rolling elements 4 is formed of two identical adjusting wedges 5 which are moveable relative to each other and whose wedge surfaces 6 are inclined opposite to each other in the longitudinal direction of the race.

FIG. 1 shows such an adjusting wedge 5 in a plan view and it has a through recess 7 delimited on the long sides by faces 8. At one end, the adjusting wedge 5 is provided with a lug 9 which has a threaded hole 10, while it is provided at the other end with a lug 11 which has both a threaded hole 12 and a through hole 13.

As shown in FIGS. 2 and 3, the oppositely inclined wedge surfaces 6 of the two adjusting wedges 5 are placed on top of each other and the rolling bearing 1 is inserted so that in recesses 7 of the adjusting wedges 5 the guide element 3 engages recesses 7, while support body 2 areas extending beyond the guide element 3 transversely to the longitudinal direction of the race are supported by faces 8 delimiting recesses 7. The adjusting wedges 5 are arranged relative to each other in the longitudinal direction of the race so that one face of the guide element 3 is opposite lug 9 of the one adjusting wedge 5 and its other face is opposite lug 11 of the other adjusting wedge 5. The height of of adjusting wedges 5 is only slightly greater than the portion of guide element 3 engaging recesses 7 in adjusting wedges 5.

For the height adjustment of the rolling bearing 1 relative to a not shown race for rolling elements 4, the lower adjusting wedge 5 is supported by an indicated bearing surface 14. An adjusting screw 15 is introduced into through hole 13 of the one adjusting wedge 5 and screwed into threaded hole 10 of lug 9 of the upper adjusting wedge 5, while an adjusting screw 16 is screwed into threaded hole 12. The rolling bearing 1 can be adjusted in the longitudinal direction as needed by turning adjusting screw 15 in the direction of arrow X or by turning adjusting screw 16 in the direction of arrow Y until the desired position is attained. Then the adjusting screw which was not used for the adjustment is tightened until wedges 5 are jammed against each other for interlocking.

Various modifications of the apparatus of the invention may be made without departing from the spirit or scope thereof and it should be understood that the invention is intended to be limited only as defined in the appended claims.

What we claim is:

1. An apparatus for height adjustment of a rolling bearing for longitudinal movement comprising a support body having two straight parallel race sections connected at their ends by two semicircular race sections, said support body being encircled by a guide element for guiding and/or holding rolling bodies in the race section, the rolling bearing being supported by two adjusting wedges moveable relative to each other whose wedge surfaces are inclined opposite to each other in the longitudinal direction of the race, characterized in that support body extends beyond the guide element transverse to the longitudinal race direction and the adjusting wedges having through recesses engaging the guide element and the zones of the support body extending beyond the guide element being supported by lateral faces of the adjusting wedges delimiting the recesses.

2. The apparatus of claim 1 wherein the total height of the adjusting wedges is only slightly greater than the portion of the guide element engaging the recesses of the adjusting wedges.

3. The apparatus of claim 2 wherein the length of the through recesses is greater than the length of the guide element.

4. The apparatus of claim 1 wherein the length of the through recesses is greater than the length of the guide element.

5. The apparatus of claim 1 wherein the two adjusting wedge are identical.

6. The apparatus of claim 1 wherein the ends of the adjusting wedges are provided with threaded holes and/or through holes to receive adjusting screws.

* * * * *